United States Patent [19]

Murata et al.

[11] 4,368,952
[45] Jan. 18, 1983

[54] MAGNETIC DISPLAY PANEL USING REVERSAL MAGNETISM

[75] Inventors: Yasuzo Murata, Kanagawa; Hiroshi Sato, Hiratsuka, both of Japan

[73] Assignee: Pilot Man-Nen-Hitsu Kabushiki Kaisha, Tokyo, Japan

[21] Appl. No.: 214,905

[22] Filed: Dec. 10, 1980

[30] Foreign Application Priority Data

Dec. 11, 1979 [JP] Japan .................. 54-159809

[51] Int. Cl.³ .................. G02F 1/01
[52] U.S. Cl. .................. 350/362
[58] Field of Search .................. 340/787, 788; 350/362

[56] References Cited

U.S. PATENT DOCUMENTS 3,670,323 6/1972 Sobel et al. .................. 350/362
4,126,854 11/1978 Sheridon .................. 350/362

Primary Examiner—William L. Sikes
Assistant Examiner—Léon Scott, Jr.
Attorney, Agent, or Firm—Sughrue, Mion, Zinn, Macpeak and Seas

[57] ABSTRACT

A magnetic reversal type display panel which provides clear display of records which can easily be raised by an erasure magnet. A liquid dispersion is sealed between two opposed surface plates, preferably in a cell structure. The liquid dispersion contains fine reversible magnetic display grains having magnetic poles of opposite signs tinged with different colors, a dispersion medium and a fine grain thickener. The fine reversible magnetic display grains have a residual magnetic moment within the range of 0.2 to 10 emu/g and a coercive force of not less than 500 oersteds and the liquid dispersion has a yield value of not less than 5 dynes/cm².

18 Claims, 18 Drawing Figures

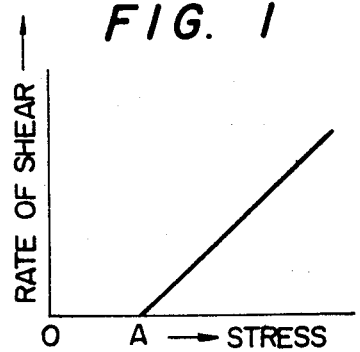
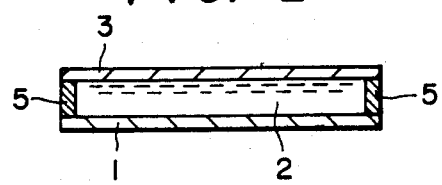
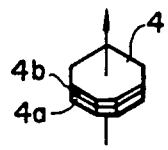
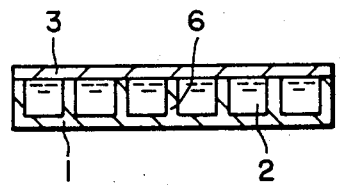
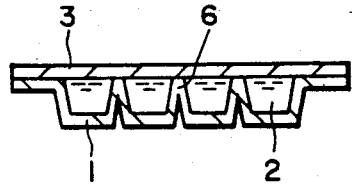
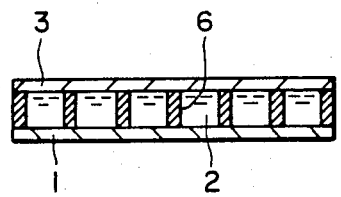
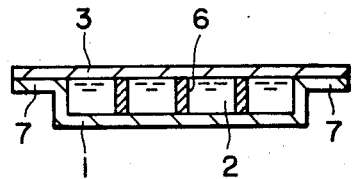
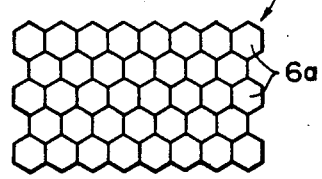
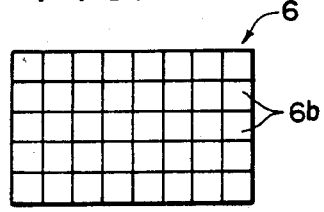
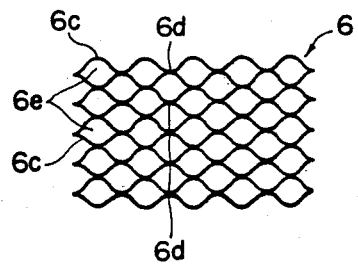

MAGNETIC DISPLAY PANEL USING REVERSAL MAGNETISM

BACKGROUND OF THE INVENTION

The present invention relates to a magnetic display panel using magnetic reversal which provides clear display of records on a surface thereof and in which displayed records are erased by means of magnetism. More particularly, the invention relates to a magnetic display panel which has sealed between two opposed surface plates a liquid dispersion composed primarily of fine magnetic display grains having magnetic poles of opposite signs tinged with different colors, a dispersion medium and a fine grain thickener. In this type of panel, a desired display is recorded by the reversal of fine magnetic display grains by means of a magnetic writing instrument.

The magnetic panels proposed to date for creating displays by the use of magnetic force have been of a type in which display is accomplished by causing an external magnetic field to act upon a liquid dispersion containing medium fine magnetic grains having magnetic poles of opposite signs tinged with different colors thereby causing the fine magnetic grains affected by the magnetic field to be reversed in position and producing a record through the contrast between the pole colors of the magnetic grains so reversed and that of the magnetic grains remaining unreversed. Erasure of the display is effected by eliminating the color contrast.

Since such display devices are solely fine magnetic grains which have magnetic poles of opposite signs tinged with different colors, they have failed to produce a desired quality of display because the fine magnetic grains attract each other and coagulate and moreover because they do not produce a rotatability as required. Such display devices, therefore, have proved generally infeasible.

With a view of overcoming these difficulties by preventing the fine magnetic grains from coagulating, there has been proposed the use of fine magnetic grains possessing a low volumetric magnetization. Such fine magnetic grains, however, are deficient in being incapable of producing satisfactory rotatability. Thus, a display device using these grains is also impracticable.

There has further been proposed the use of a thixotropic liquid dispersion containing fine magnetic grains. In general, a thixotropy is a property such that when a stress is continnously applied to a liquid, the viscosity of the liquid decreases and when the stress is removed, the viscosity returns to the original value. In a magnetic display panel using such a thixotropic liquid dipersion, as the fine magnetic grains are merely dispersed in the thixotropic liquid, the rotatability of the fine magnetic grains is quite low. Further, the fine magnetic grains tend to be dispersed non-uniformly in the dispersion. As a result, a clean display cannot be obtained and it takes an excess time to record the display.

As described above, none of the conventional magnetic display panels have been able to produce clear record displays by the agency of magnetism.

SUMMARY OF THE INVENTION

The invention provides a magnetic display panel of the magnetic reversal type which overcomes all the drawbacks mentioned above and is highly advantageous. Specifically, the present invention provides a magnetic display panel of the magnetic reversal type which includes two opposed surface plates and a liquid dispersion sealed between the surface plates and formed substantially of fine reversible magnetic display grains having magnetic poles of opposite signs tinged with different colors, a dispersion medium and a fine grain thickener, wherein:

(A) the fine reversible magnetic display grains have a residual magnetic moment within the range of from 0.2 to 10 emu/g and a coercive force of not less than 500 oersteds, and (B) the liquid dispersion has a yield value of not less than 5 dynes/cm$^2$.

BRIEF DESCRIPTION OF THE DRAWINGS

FIG. 1 is a graph showing the rate of shear as a function of stress relating to an explanation of the yield value of a magnetic display panel of the present invention;

FIG. 2 is a sectional view of a preferred embodiment magnetic display panel of the present invention;

FIG. 3 is an enlarged perspective view illustrating the shape of one of the fine magnetic grains used in the magnetic display panel of FIG. 2;

FIGS. 4–7 are sectional views illustrating other preferred embodiments of the magnetic display panel of the invention;

FIGS. 8–12 are partial plan views of multi-cell structures used in a magnetic display of the invention;

DESCRIPTION OF THE PREFERRED EMBODIMENTS

Figure 11:
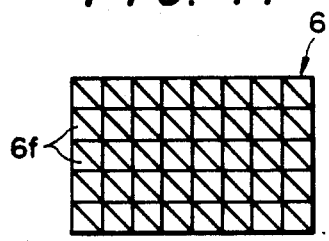

The invention is particularly characterized by the use of fine reversible magnetic display grains having magnetic poles of opposite signs tinged with different colors and having a residual magnetic moment within the range of from 0.2 to 10 emu/g and a coercive force of not less than 500 oersteds and further the use of a liquid dispersant containing the aforementioned fine reversible magnetic display grains and having a yield value of not less than 5 dynes/cm$^2$.

Since a display panel of the invention effects the display of a record not by the floatation and sedimentation of fine magnetic grains having magnetic poles of opposite signs tinged with different colors but the reversal of such fine magnetic grains. The existence of specific conditions among the yield value of the liquid dispersion and the residual magnetic moment and coercive force of the fine reversible magnetic display grains is an absolute prerequisite. The reason is that the liquid dispersion and the fine reversible magnetic display grains are required to possess relative properties such that the conditions for enabling the fine magnetic grains to exhibit their desired effect of providing thorough dispersion and avoiding sedimentation and for permitting the fine magnetic grains to be properly rotated and prevented from coagulation are wholly satisfied. In order to achieve this, the liquid dispersion should possess a yield value of not less than 5 dynes/cm$^2$. The term "yield value" as used herein means the lowest stress required to cause a liquid to flow. This is indicated by the stress at point A in the flow curve shown in FIG. 1.

A liquid dispersion having a yield value of not less than 5 dynes/cm$^2$ has the property of preventing fine magnetic grains from sedimenting and coagulating and also permitting the fine magnetic grains to be reversed at the moment when a magnetic field is applied thereto. Accordingly, the provision of a liquid dispersion having a yield value of not less than 5 dynes/cm$^2$ is a prerequisite for a clear display. Such a property cannot be provided with a thixiotropic liquid dispersion.

With respect to the residual magnetic moment of the fine reversible magnetic display grains, its value is more than 0.2 emu/g, and the reversal of the magnetic grains is not sufficiently effected no matter how much the yield value may be adjusted.

For the sole purpose of rotating the fine reversible magnetic display grains, the magnitude of the residual magnetic moment is desired to be as high as permissible. If the residual magnetic moment is excessively increased, the fine reversible magnetic display grains coagulate so tightly as to prevent dispersion and to render display by magnetic reversal impossible. Normally, the fine reversible magnetic display grains are thoroughly coagulated when the residual magnetic moment of the magnetic grains has a value lower than 10 emu/g. It is to be noted that the liquid dispersion having a yield value of not less than 5 dynes/cm$^2$ which is used in the present invention exhibits a residual magnetic property totally different from the property of any ordinary liquid dispersion which prevents the fine reversible magnetic display grains from coagulating. If the residual magnetic moment of the fine reversible magnetic display grains exceeds 10 emu/g, even a liquid dispersion possessing a yield value of not less than 5 dynes/cm$^2$ tends to become incapable of preventing the coagulation of the fine magnetic grains with the result that display produced by rotation of the fine magnetic grains tends to be of low clarity. The residual magnetic moment of the fine reversible magnetic display grains, therefore, must be not more than 10 emu/g.

Since the invention effects the display of a record by the rotation of fine reversible magnetic display grains, rotatability is not the sole requirement for the fine reversible magnetic display grains although an appropriate rotation is necessary. Reversal of fine reversible magnetic display grains may possibly occur in different ways. In one way, magnetic poles of a desired sign in the fine reversible magnetic display grains are not allowed to be rotated to a position parallel to the display surface of the panel, in another way, the magnetic poles are rotated to that position, and in yet another way, the magnetic poles are rotated by more than 180° and therefore are finally arrayed in irregular positions. It has been ascertained by the inventors that for the sake of display clarity, the magnetic poles of fine reversible magnetic display grains which effect display should be stopped after rotating through 180° so that they are arrayed in a position parallel to the display surface of the panel. When the angle of their rotation either exceeds or falls short of 180°, the relevant magnetic poles fail to fall in the position parallel to the display surface and therefore fail to provide a clear display.

In order to stop the rotation of such magnetic poles exactly at the desired position, the residual magnetic moment of the fine reversible magnetic display grains and the yield value of the liquid dispersion are required to possess specific relative properties. Magnetic reversal is advantageously effected and the relevant magnetic poles of the fine magnetic grains appear prominently through the display surface of the panel to produce displays only when the panel uses a liquid dispersion having a yield value of not less than 5 dynes/cm$^2$ and fine magnetic display grains possess a residual magnetic moment within the range of from 0.2 to 10 emu/g.

For the present invention, it is also a prerequisite for the fine reversible magnetic display grains to have a coercive force of not less than 500 oersteds.

If the display is accomplished solely by the floatation and sedimentation of fine reversible magnetic display grains, the coercive force thereof need not exceed a level of 500 oersteds but may be at a much lower level. Where the magnetic poles of fine magnetic grains are reversed as in the display of the present invention, the coercive force must exceed 500 oersteds. When the coercive force is less than 500 oersteds, the opposite poles of the fine reversible magnetic display grains remain oriented randomly relative to the display surface of the panel and hence the magnetic poles used to effect the display fail to be arrayed in a plane parallel to the display surface with the result that the display panel does not provide a clear display.

As described above, perfect reversal of the fine magnetic grains can be attained where the coercive force exceeds 500 oersteds. If the coercive force exceeds 800 oersteds, there is another advantage that no matter how strong the magnetic force of the external field applied to record the display, the fine reversible magnetic display grains are not affected by the magnetic force.

Thus, when the three conditions mentioned above are wholly satisfied, a magnetic display panel which provides a clear display is obtained.

Figure 18:
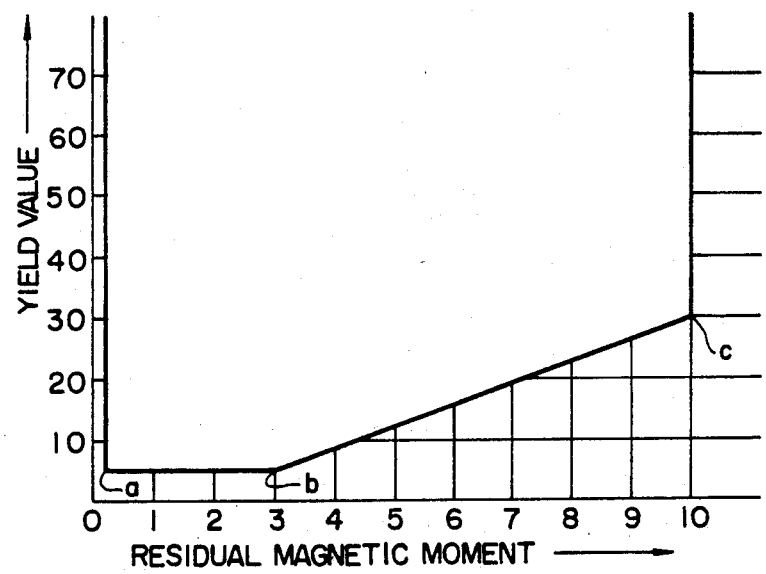
FIG. 18 is a graph showing the relation between the residual magnetic moment and the yield value of a magnetic display panel of the invention.

Better results are provided by increasing the yield value of the liquid dispersion in proportion to the increase in the residual magnetic moment of the fine reversible magnetic display grains. The most advantageous yield value falls in the zone above the lines connecting the points a, b and c in the graph of FIG. 18. Even if the yield value falls in the zone below the lines a-b-c, a display can still be obtained so long as the yield value is not less than 5 dynes/cm$^2$. The preference for the value to be above these lines to is because the trend of the fine reversible magnetic display grains toward mutual coagulation increases in proportion to the increases in the residual magnetic moment and the effect of preventing mutual coagulation can be strengthened by increasing the yield value of the liquid dispersion.

The residual magnetic moment and coercive force of the fine magnetic grains in the present invention can be determined as indicated below by use of a vibration sample type magnetometer (Model VSMP-1, made by Toei Kogyo C., Ltd.). A measuring case formed of a lid (A) and a case proper (B) as defined below is packed tightly with a given sample of fine magnetic grains and the measuring case is exposed to the magnetic field generated by the magnetometer and a hysteresis curve of the sample is recorded on the XY recorder of the instrument. The residual magnetic moment of the sample is calculated from the hysteresis curve and the residual magnetic moment per unit weight (in emu/g) of the sample is determined by dividing the value resulting from this calculation by the total weight (in grams) of the fine magnetic grains in the measuring case.

(A) A lid of acrylic resin is composed of a disk measuring 1 mm in thickness and 6.0 mm in diameter and an annular fitting projection raised from one of the opposite surfaces of the disk and measuring 0.5 mm in height and 5 mm in inside diameter.

(B) The bottomed cylindrical case proper is composed of acrylic resin measuring 6.0 mm in outside diameter and 5.5 mm in outside length and containing a circular hole 5 mm in diameter and 5.2 mm in depth.

The yield value of the liquid dispersion of fine magnetic grains used with the present invention can be determined by a direct method as described below by the use of a Brookfield Type-BL viscosimeter (made by Tokyo Keiki Co., Ltd.). With the rotor of the viscosimeter immersed in a sample of the liquid dispersion, the liquid dispersion is made to revolve around the rotor at a very low speed of 0.2 r.p.m. without rotating the rotor. The revolution of the liquid dispersion causes a resultant torque on the rotor which twists the spring of the rotor. Once the twist of the rotor has reached a certain angle, sliding begins to occur between the liquid dispersion and the rotor. The yield value of the sample liquid dispersion is calculated by taking the scale reading of the angle of the rotor at the time sliding begins to occur and comparing the scale reading with the torsion constant of the spring of the rotor taking into account the shape and available area of the rotor. The formulas for conversion are as follows:

| Rotor No. | Yield Value |
| --- | --- |
| Rotor No. 1 | $0.168\theta$ |
| Rotor No. 2 | $0.840\theta$ |
| Rotor No. 3 | $3.360\theta$ |

In the formulas, $\theta$ denotes the scale reading of the twist angle.

In the construction of the magnetic display panel of the present invention in which the liquid dispersion is sealed between the two opposed surface plates, although the space between the two surface plates may be suitably selected depending on the use intended for the display, it should preferably be set in a range of from 0.5 mm to 20 mm for the purpose of enabling records to be displayed clearly with a high color contrast and for permitting the displayed record to be thoroughly erased. The optimum range for the space is from 0.5 mm to 2.0 mm.

Of the two opposed surface plates forming the enclosure of the display panel, that surface plate through which the displayed record produced in the liquid dispersion is viewed is preferably transparent although it may optionally be translucent depending on the intended use. This surface plate, therefore, can be of various types of plastic material or glass. The other surface plate need not be transparent and can be made of of various types of plastic material, glass or metal. The plastic material or glass thus used for the surface plate may be colored or not as desired. It is important that proper measures be taken to prevent the liquid dispersion sealed between the two opposed surface plates from leaking out. For this purpose, the opening between the conforming boundaries of the two opposed surface plates can be stopped with a blocking plate or filled with an adhesive or sealed by fusion. Alternatively, the magnetic display panel may be formed by joining one surface plate to one side of a plate incorporating a plurality of independent through cells, sealing the liquid dispersion in the cells and thereafter joining the other surface plate to the other side of the multi-cell plate. Otherwise, still another construction may be used in which the liquid dispersion is sealed in a plurality of cells provided in a plate separated from one another and thereafter joining another surface plate to the multi-cell plate. These multi-cell magnetic display panels provide very high structural stability through a prolonged period of service under quite harsh handling conditions compared with panels not incorporating the multi-cell structure. The cells may have a circular or polygonal cross section. The continuity of the displayed record is reduced as the thickness of the partition walls separating the individual cells is increased. The thickness, therefore, is desirably not more than 0.5 mm.

The expression "fine magnetic grains having magnetic poles of opposite signs tinged with different colors" as used herein is meant even to embrace all conceivable types of magnetic grains including those having surface magnetic poles of opposite signs tinged with different colors and those having only magnetic poles of one selected sign tinged with color. This is because the magnetic reversal effect can produce a color contrast necessary for the purpose of display so long as the pattern area formed of reversed magnetic poles has a color different from the color of the remaining background area formed of unreversed magnetic poles.

As the magnetic substance, at least one of ferrites, rare earth cobalt compounds, or the like are preferred. Examples of ferrites include barium ferrite, strontium ferrite, lead ferrite and cobalt ferrite while examples of rare earth cobalt compounds include yttrium cobalt, cerium cobalt, praseodynium cobalt and samarium cobalt.

The fine magnetic grains can be obtained by preparing two paints of different color at least one of which contains a magnetic substrate, forming a composite sheet of two layers of different color from the two paints, then applying a magnetic field to the magnetic substance in the composite sheet thereby imparting a fixed magnitude of magnetic field thereto and subsequently dividing the composite sheet into fine grains. In this case, the amount of the magnetic substance is variable depending on its particular type. Generally if this amount is set within a range of from 1 to 40% by weight based on the fine magnetic grains, the residual magnetic moment of the fine magnetic grains is within the range of from 0.2 to 10 emu/g.

The fine magnetic grains generally have a particle size within the range of 20 to 500 microns, preferably 44 to 250 microns.

Advantageous examples of magnetic substances possessing coercive forces exceeding 800 oersteds include cobalt-containing gamma iron oxide and cobalt-containing magnetites besides the aforementioned ferrites and rare earth cobalt compounds.

The amount of fine magnetic grains to be used in the liquid dispersion is desired to exceed 4 parts per 100 parts of the dispersion medium (described below). The reason for this lower limit to the amount of fine magnetic grains is that, if this amount falls below the limit, the amount of fine magnetic grains reversed by application of the magnetic writing pen to the display surface of the panel is not sufficient to densely fill the traces of the magnetic writing pen with the result that the displayed letter or pattern possibly appears as discontinued lines full of unfilled streaks.

The liquid dispersion used for the invention has the fine magnetic grains, the dispersion medium and the fine grain thickener which is insoluble in the dispersion medium as defined above as its three essential components. Of the three components, the dispersion medium may be selected from among polar dispersion media such as water and glycols and non-polar dispersion media such as organic solvents and oils. Particularly, aliphatic hydrocarbon solvents typified by iso-paraffin type solvents exhibit highly desirable properties as dispersion media.

Examples of thickeners which are usable for providing the liquid dispersion with a yield value within the defined range of the present invention include (A) finely divided silicic acid and finely divided silicates such as silicic anhydride, hydrated silicic acid, hydrated calcium silicate, hydrated aluminum silicate, powdered silica, diatomceous earth, kaoline, hard clay, soft clay, bentonite and organic bentonite, (B) finely powdered alumina, (C) finely divided calcium carbonates such as extremely finely powdered calcium carbonate, slightly powdered calcium carbonate and extremely finely powdered activated calcium, (D) finely divided magnesium carbonates such as hydrated basic magnesium carbonate, (E) barium sulfate, (F) benzidine yellow, (G) olefin polymers such as polyethylene, low molecular weight polyethylene, polypropylene and low molecular weight polypropylene, (H) copolymers of olefins with copolymerizable monomers such as ethylene-vinyl acetate copolymer, ethyleneethyl acrylate copolymer and ethylene-unsaturated organic acid copolymer, (I) polyalkyl styrenes, (J) waxes, (K) metal soaps, (L) fatty acid amides, (M) dextrin fatty acid esters, (N) hydroxypropyl cellulose esters, (O) sucrose fatty acid esters, (P) acylamino acid esters, (Q) starch fatty acid esters and (R) dibenzilydene sorbitol. These fine grain thickeners may be used either singly or in combination. The amount of the fine grain thickener to be used is more or less variable depending on the particular kinds of dispersion medium and thickener to be used. Generally when the thickener is provided in an amount of not less than 0.5% by weight based on 100% by weight of the dispersion medium, the liquid dispersion has a yield value of not less than 5 dynes/cm$^2$.

Among the thickeners enumerated above, if an olefin polymer, olefin copolymer, wax, metal soap or acrylamino acid ester or a mixture of finely divided silicic acid with at least one member selected from among the olein polymers, olefin copolymers, waxes, metal soaps and dextrin fatty esters is used, the yield value of the liquid dispersion will retain its yield value even in the presence of foreign matter and will give desirable results with high reproducibility. During the construction of the magnetic display panel, there is a possibility that foreign matter may get into the liquid dispersion. Use of a mixture of finely divided silicic acid with at least one member selected from among olefin polymers, olefin copolymers, waxes, metal soaps and dextrin fatty acid esters is advantageous in that the yield value of the liquid dispersion is maintained even if foreign matter is undesirably included.

Since the addition of a small amount of a surface active agent to the aforementioned essential components of the liquid dispersion results in adjustment of the yield value, such addition of the surface active agent is desirable. Examples of surface active agents which are usable for this purpose include sorbitan fatty acid esters, polyoxyethylene alkyl ethers, and polyoxyethylene alkyl phenol ethers. For advantageous use in the present invention, the surface active agent should not possess any thickening ability.

The liquid used for dispersing the fine magnetic grains for use with the present invention is desired to be transparent although it may be translucent where circumstances permit. For this purpose, there may be selected a colored thickener such as barium sulfate or benzidine yellow. Otherwise, the translucent liquid may be prepared by the addition of a specifically selected coloring agent such as dye, pigment or fluorescent dye.

The liquid dispersion used with the present invention is prepared by a combination of fine magnetci grains and a dispersion medium with a surface active agent and/or a coloring agent optionally added thereto.

For the magnetic writing medium to be used with the magnetic display panel of the present invention, either a permanent magnet or an electromagnet can be used. The writing medium can be provided in the form of a magnetic writing pen and a magnetic stamp, and slidably mounted on the magnetic display panel.

Although the magnetic writing pen is required to have a constant surface area suitable for the purpose for which the pen is used, the contact surface diameter generally should be within the range of from 1 to 3 mm. If the pen is used for writing letters composed of thick strokes or as a stamp, for example, the contact surface provides ease of use if the diameter thereof falls within the range of from 10 to 80 mm. The magnetic eraser to be used for erasing the displayed record is required to have a relatively large contact surface area. This eraser may be used for total or partial erasure of the displayed record. When two magnetic writing pens of different magnetic polarity and two magnetic erasers correspondingly different in magnetic polarity are provided in the case where the fine magnetic grains have their electric poles of opposite signs tinged with black and white, a record can be displayed with either black lines on a white background or with white lines on a black background. While magnetic writing pens and magnetic erasers may be individually produced and supplied in combination with the magnetic display panel, magnetic writing pens and/or magnetic erasers of opposite magnetic polarities may be attached one each to the opposite ends of independent handles.

The magnetic panel of the present invention is manufactured by sealing a liquid dispersion between two opposed surface plates. A liquid dispersion having a yield value of not less than 5 dynes/cm$^2$ is produced by combining fine magnetic grains having a residual magnetic moment within the range of from 0.2 to 10 emu/g and a coercive force of not less than 500 oersteds, a dispersion medium and a fine grain thickener as essential components.

Particularly, in manufacturing the fine magnetic grains, the present invention is characterized in that a composite sheet in the form of two layers and containing a magnetic substance to which a magnetic field is applied is pulverized in a liquid medium to produce a particle size within the range of from 20 to 500 microns. In contrast, if a composite sheet were subjected to pulverization without the use of a liquid medium, the heat generated in the course of the pulverization would tend to cause the paint on some of the finely pulverized magnetic grains to adhere to and smudge the paint on other magnetic grains resulting in an unclear display. However, in accordance with the present invention, fine pulverization of the composite sheet is carried out in a liquid medium, the individual fine magnetic grains are kept from rubbing against one another and magnetic poles tinged with two different color will not be smudged resulting in a clear display.

The clarity of display on the display panel is augmented by the fact that, in the liquid dispersion sealed in the space between the two opposed surface plates, the fine magnetic grains are densely distributed in a zone close to the display surface side of the panel. For this reason, subsequent to the construction of the magnetic display panel, desirable results are obtained if a magnet having N poles and S poles alternately arranged in its surface intended for contact with the display surface plate of the panel is passed over the surface of the plate to exert a crossed magnetic field on the fine magnetic grains distributed in the liquid dispersion.

The present invention will now be described below with reference to the accompanying drawings.

FIG. 2 illustrates a magnetic display panel which is formed by filling a liquid dispersion 2 between a transparent front surface plate 3 and a rear surface plate 1 and sealing the opening along the conforming boundaries of the two surface plates with blocking plates or an adhesive agent 5. Within the liquid dispersion 2, fine magnetic grains 4 of a shape shown in FIG. 3 are dispersed. The fine magnetic grains 4 are each formed of a black-colored layer 4a containing a magnetic substrate and a white-colored layer 4b deposited over the black-colored layer. The magnetic grains 4 are magnetized so that the magnetic poles of one sign point in the direction of the arrow.

FIG. 4 illustrates a magnetic display panel which is formed by interposing between the surface plates 1 and 3 a multi-cell structure 6 composed of a plurality of partition walls individually defining independent cells and collectively constituting an integral part of the surface plate 1, closing the open sides of the cells by application of the surface plate 3 thereto and subsequently filling the interiors of the individual cells with the liquid dispersion 2.

FIG. 5 illustrates a magnetic display panel which is formed by interposing between the surface plates 1 and 3 a multi-cell structure 6 composed of a plurality of recesses individually defining independent cells and collectively constituting an integral part of the surface plate 1, closing the open sides of the cells by application of the surface plate 3 thereto and subsequently filling the interiors of the individual cells with the liquid dispersion 2.

FIG. 6 illustrates a magnetic display panel which is formed by interposing between the surface plates 1 and 3 a multi-cell structure 6 composed of a plurality of cell plates defining through holes which form independent cells, closing the opposite open sides of the cells by application of the surface plates 1 and 3 thereto and subsequently filling the interiors of the individual cells with the liquid dispersion 2.

FIG. 7 illustrates a magnetic display panel which is formed by interposing between the surface plates 1 and 3 a multi-cell structure 6 composed of a plurality of cell plates defining through holes forming independent cells, joining the plurality of cell plates to the bottom of a recess formed in the central part of the surface plate 1, joining the peripheral edge portion 7 of the surface plate 1 and the open sides of the cells to the surface plate 3 and filling the interiors of the individual cells with the liquid dispersion 2.

Figure 12:
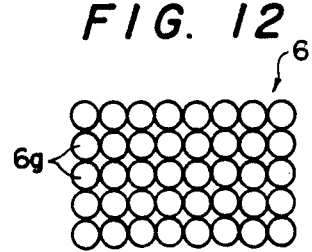

The multi-cell structure 6 illustrated in any of the diagrams described above may be in the shape of a honeycomb 6a illustrated in FIG. 8 or in the shape of an aggregate of squares 6b as illustrated in FIG. 9. Otherwise, it may be in the shape of a prosenchyma 6e formable as illustrated in FIG. 10 by arraying a plurality of corrugated plates 6c parallel to each other and fastening the peaks 6d of each corrugated plate 6c to those 6d of the adjacent corrugated plate 6c. It may further be in the shape of a compact aggregate of cells of a triangular cross section 6f as illustrated in FIG. 11 or a rectangular aggregate of cells of a circular cross section 6g as illustrated in FIG. 12.

Figure 13:
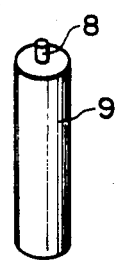
FIGS. 13–17 are explanatory diagrams of magnetic writing pens to be used in combination with a magnetic display panel of the present invention.
Figure 15:
Figure 14:
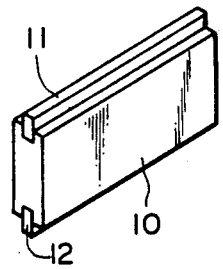
Figure 16:

FIGS. 13-17 illustrate examples of magnetic wiring pens usable in combination with the magnetic display panel of the present invention. FIG. 13 illustrates a magnetic writing pen 8 joined to a handle shaft 9. FIG. 14 illustrates a magnetic eraser which is composed of a handle piece 10 and magnets 11, 12 having contact edges of opposite magnetic polarities on opposite edges of the handle piece. FIG. 15 illustrates a magnetic writing pen 8 having a cylindrical contact point 8a. FIG. 16 illustrates a magnetic writing pen 10 with an annular contact point 8b.

Before recording on the display, the magnetic eraser 11 is passed over the front side of the surface plate 3 of the magnetic display panel so that all the fine magnetic grains 4 having magnetic poles of one sign, tinged with white for example, are directed toward the surface plate 3. Then the magnetic writing pen 8 is moved upon the surface plate 3 to draw lines of a desired record on the surface plate 1 side or the surface plate 3 side of the magnetic display panel by exerting a magnetic field upon those fine magnetic grains falling under the lines of the pen's movement and causing only these fine magnetic grains to be reversed so that their poles of a different sign tinged with another color, black for example, are directed toward the surface plate 3. Consequently, the record is displayed as black lines on a background of white. By repeating this procedure, the display of a record and the erasure of the displayed record can be obtained again and again.

On the same magnetic display panel, the record can be displayed in white lines on a background of black after the magnetic eraser 12 is passed over the front side of the panel using a magnetic writing pen having at the contact point thereof a magnetic pole of opposite sign from that of the magnetic writing pen 8 which is moved to draw the lines of the record as described above.

Optionally, the magnetic display panel can be modified, such as for the game of "GO" by marking one of the surface plates with intersecting lines. The panel is then used in combination with the magnetic writing pens shown in FIG. 15 and FIG. 16.

Figure 17:

The magnetic display panel can otherwise be modified for a variation of the game of "GO" when the panel is marked similarly with intersecting lines and it is used in combination with the magnetic writing pens of FIG. 15 and FIG. 16 and the magnetic writing pen of FIG. 17 which contains within the circular wall of its cylindrical contact point 8c a round magnet 8d of different sign from the contact point 8c. Using the pens, a solid circle displayed by the use of the magnetic writing pen of FIG. 15 can be changed into a blank circle by placing the tip of the magnetic writing pen of FIG. 17 over the solid circle.

Since the magnetic display panel of the present invention enables a record to be displayed with a high clarity and permits thorough erasure of the displayed record, it is suitable for playing GO and such games and also, for example, for displaying results of various sports played indoors and outdoors and in swimming pools, toys for infants, teaching equipment, writing boards, various game boards, memorandum boards, record displaying boards, blackboards, white-boards, dustless displaying boards, advertizing boards, POP boards, or underwater record displaying boards utilizing a recording and erasing system in which recording is effected without using liquid ink, being completely stable against water.

Now, examples of the display panels of the invention will be cited below. Whenever "parts" of a particular substance are mentioned, they are expressed by weight.

EXAMPLE 1

A white paint was prepared by dispersing 70 parts of Tipaque CR-50 (titanium dioxide made by Ishihara Sangyo K.K.) in 75 parts of a solution of 40% Epo-Tohto YD-017 (a solid epoxy resin made by Tohto Kasei K.K.) in methylethyl ketone.

A black paint was prepared by dispersing 4.9 parts of BF-T (barium ferrite powder made by Toda Kogyo K.K.) and 1.5 part of MA-11 (carbon black made by Mitsubishi Chemical Industry Co., Ltd.) in 250 parts of a solution of 40% Epo-Tohto YD-017 in methylethyl ketone.

The white paint was applied with a wire bar to one surface of a polypropylene film 30 microns in thickness. The applied coat of the white paint dried to a thickness of 24 microns. The black paint was subsequently applied over the white coat in a similar manner. The applied coat of the black paint dried to a thickness of 18 microns.

Subsequently, the composite layer was magnetized with the black coat side as the N pole and the white coat side as the S pole respectively. The two coats bound tightly to each other were peeled off the polypropylene film, mixed with water, pulverized by a homogenizer and classified to yield flake-shaped fine magnetic grains measuring 44 to 149 microns in particle size and having their opposite magnetic poles tinged with the two colors, black and white. When the grains were tested for residual magnetic moment with a specimen-vibration type magnetometer with a sample placed to capacity in the testing case, they showed a value 0.30 emu/g. They had a coercive force of 2600 oersteds.

Next, 1.1 parts of A-C Polyethylene #9 (low molecular weight polyethylene made by Allied Chemical Corp.) was dissolved by heating in 98.9 parts of Isopar M (an iso-parrafin solvent made by Esso Chemical Co.) and the resultant solution was cooled. A liquid dispersion was obtained by dispersing 4 parts of the fine magnetic grains in 14 parts of the liquid dispersion. When this liquid dispersion was tested for yield value by the direct method using a B type viscosimeter, the result was 6 dynes/cm$^2$.

Subsequently, a case was formed by disposing two glass sheets 0.2 mm in thickness opposite one another and sealing three of the four common boundaries of the glass sheets with interposed plastic spacers 1 mm in thickness and an adhesive agent.

Finally, a magnetic display panel was produced by filling the case with the liquid dispersion and sealing the remaining common boundary with the same plastic spacer and the same adhesive agent.

EXAMPLE 2

A magnetic display panel was produced following the procedure of Example 1 except that the black paint was prepared by dispersing 15 parts of BF-T and 2.5 parts of MA-11 in 330 parts of solution of 40% Epo-Tohto YD-017 in methylethyl ketone solution. The black paint layer of the fine magnetic grains had a thickness of 15 microns and the white paint layer a thickness of 20 microns. The fine magnetic grains had a residual magnetic moment of 0.81 emu/g and a coercive force of 2750 oersteds and the liquid dispersion had a yield value of 6 dynes/cm$^2$.

EXAMPLE 3

A magnetic display panel was produced following the procedure of Example 1 except that the black paint was prepared by dispersing 9.8 parts of BF-T and 0.4 part of MA-11 in 90 parts of solution of 40% Epo-Tohto YD-017 in methylethyl ketone solution and the black paint layer of the fine magnetic grains had a thickness of 22 microns and the white paint layer a thickness of 19 microns. The fine magnetic grains had a residual magnetic moment of 1.87 emu/g and a coercive force of 2780 oersteds and the liquid dispersion had a yield value of 6 dynes/cm$^2$.

EXAMPLE 4

A magnetic display panel was produced following the procedure of Example 1 except that the black paint was prepared by dispersing 14.7 parts of BF-T and 0.6 part of MA-11 in 85 parts of a solution of 40% Epo-Tohto YD-017 in methylethyl ketone and the black paint layer of the fine magnetic grains had a thickness of 27 microns. The fine magnetic grains had a residual magnetic moment of 3.00 emu/g and a coercive force of 2760 oersteds and the liquid dispersion had a yield value of 6 dynes/cm$^2$.

EXAMPLE 5

A magnetic display panel was produced following the procedure of Example 1 except that the black paint was prepared by dispersing 22 parts of MC-10 (a cobalt-containing gamma iron oxide made by Toda Kogyo K.K.) and 5 parts of MA-11 in 222.5 parts of a solution of 40% Epo-Tohto YD-017 in methylethyl ketone and the black paint layer of the fine magnetic grains had a thickness of 10 microns and the white paint layer a thickness of 34 microns. The fine magnetic grains had a residual magnetic moment of 1.52 emu/g and a coercive force of 800 oersteds and the liquid dispersion had a yield value of 6 dynes/cm$^2$.

Examples 6–9 are summarized in the following table.

In Examples 6–9, the magnetic display panels were produced following the procedure of Example 1 except the liquid dispersions used therein were obtained by first preparing a liquid dispersion of 2 Parts of Aerosil 200 (finely powdered silicic acid made by Japan Aerosil Co.) and 0.4 part of Aracel 83 (a nonionic surface active agent made by Kao-Atlas Co.) dispersed in 97.6 parts of Isopar-M and then dispersing 4 parts of the fine magnetic grains obtained, respectively, as in Examples 1–4 in 14 parts of aliquots of the aforementioned solution.

|  | Fine magnetic grains | | | Yield value of liquid dispersion (dynes/cm$^2$) |
|---|---|---|---|---|
|  | Residual magnetic moment (emu/g) | Coercive force (oersted) | Procedure used | |
| Example 6 | 0.30 | 2600 | Example 1 | 14.7 |
| Example 7 | 0.81 | 2750 | Example 2 | 14.7 |
| Example 8 | 1.87 | 2780 | Example 3 | 14.7 |
| Example 9 | 3.00 | 2760 | Example 4 | 14.7 |

EXAMPLE 10

A magnetic display panel was produced following the procedure of Example 1 except that the black paint was prepared by dispersing 92.5 parts of BF-T and 4 parts of MA-11 in 292.5 parts of solution of 40% Epo-Tohto YD-017 in methylethyl ketone and fine magnetic grains having a black paint layer thickness of 18 microns were dispersed in the same solution as used in Example 6. The fine magnetic grains had a residual magnetic moment of 4.65 emu/g and a coercive force of 2760 oersteds and the liquid dispersion had a yield value of 14.7 dynes/cm$^2$.

EXAMPLE 11

A magnetic display panel was produced following the procedure of Example 1 except that fine magnetic grains were prepared by the procedure of Example 5 and the liquid dispersion was obtained by the procedure of Example 6. The fine magnetic grains had a residual magnetic moment of 1.52 emu/g and a coercive force of 800 oersteds and the liquid dispersion had a yield value of 14.7 dynes/cm$^2$.

Examples 12-16 are summarized in the following table.

In Examples 12-16, the magnetic display panels were produced following the procedure of Example 1 except that the liquid dispersions used therein were obtained by first preparing a liquid dispersion of 2.2 parts of Aerosil 200 and 0.4 part of Aracel 83 dispersed in 97.4 parts of Isopar-M and then dispersing 4 parts of the fine magnetic grains obtained, respectively, in Examples 1-4 and Example 10 in aliquots of the aforementioned solution.

|  | Fine magnetic grains | | | |
| --- | --- | --- | --- | --- |
|  | Residual magnetic moment (emu/g) | Coercive force (oersted) | Procedure used | Yield value of liquid dispersion |
| Example 12 | 0.30 | 2600 | Example 1 | 26.0 |
| Example 13 | 0.81 | 2750 | Example 2 | 26.0 |
| Example 14 | 1.87 | 2780 | Example 3 | 26.0 |
| Example 15 | 3.00 | 2760 | Example 4 | 26.0 |
| Example 16 | 4.65 | 2760 | Example 10 | 26.0 |

EXAMPLE 17

A magnetic display panel was produced following the procedure of Example 1 except that a black paint was prepared by dispersing 100 parts of BF-T and 4 parts of MA-11 in 200 parts of a solution of 40% Epo-Tohto YD-017 in methylethyl ketone. Moreover, the black paint layer of the fine magnetic grains had a thickness of 16 microns and the white paint layer a thickness of 21 microns and the solution was prepared by following the procedure of Example 12. The fine magnetic grains had a residual magnetic moment of 6.05 emu/g and a coercive force of 2780 oersteds and the liquid dispersion had a yield value of 26.0 dynes/cm$^2$.

EXAMPLE 18

A magnetic display panel was produced by following the procedure of Example 1 except that the fine magnetic grains were obtained by the procedure of Example 5 and the liquid dispersion was obtained by the procedure of Example 12. The fine magnetic grains had a residual magnetic moment of 1.52 and emu/g and a coercive force of 800 oersteds and the liquid dispersion had a yield value of 26.0 dynes/cm$^2$.

Examples 19-30 are summarized in the following table.

In Examples 19-25, the magnetic display panels were produced by following the procedure of Example 1 except that the liquid dispersions used therein were obtained by first preparing a liquid dispersion of 2 parts of Aerosil 200 dispersed in 98.0 parts of Isopar-M and then dispersing 4 parts of the fine magnetic grains obtained, respectively, in Examples 1-5, Example 10 and Example 17 in aliquots of the aforementioned solution.

In Examples 26-30, the magnetic display panels were produced by following the procedure of Example 1 except that the liquid dispersions used therein were obtained by first preparing a liquid dispersion of 2.5 parts of Aerosil 200 and 0.4 part of Aracel 83 dispersed in 97.1 parts of Isopar-M and then dispersing 4 parts of the fine magnetic grains obtained respectively in Examples 2-4, Example 10 and Example 17 in aliquots of the aforementioned liquid dispersion.

|  | Fine magnetic grains | | | |
| --- | --- | --- | --- | --- |
|  | Residual magnetic moment (emu/g) | Coercive force (oersted) | Procedure used | Yield value of liquid dispersion |
| Example 19 | 0.30 | 2600 | Example 1 | 38.6 |
| Example 20 | 0.81 | 2750 | Example 2 | 38.6 |
| Example 21 | 1.87 | 2780 | Example 3 | 38.6 |
| Example 22 | 3.00 | 2760 | Example 4 | 38.6 |
| Example 23 | 4.65 | 2760 | Example 10 | 38.6 |
| Example 24 | 6.05 | 2780 | Example 17 | 38.6 |
| Example 25 | 1.52 | 800 | Example 5 | 38.6 |
| Example 26 | 0.81 | 2750 | Example 2 | 54.6 |
| Example 27 | 1.87 | 2780 | Example 3 | 54.6 |
| Example 28 | 3.00 | 2760 | Example 4 | 54.6 |
| Example 29 | 4.65 | 2760 | Example 10 | 54.6 |
| Example 30 | 6.05 | 2780 | Example 17 | 54.6 |

EXAMPLE 31

White paint was prepared by dispersing 70 parts of Tipaque CR-50 in 75 parts of a solution of 40% Epo-Tohto YD-017 in methylethyl ketone. Black paint was prepared by dispersing 9.8 parts of BF-T and 0.4 part of MA-11 in 90 parts of a solution of 40% Epo-Tohto YD-017 in methylethyl ketone. The white paint was applied with a wire bar to one surface of a polypropylene film 30 microns in thickness. The applied coat of the white paint dried to a thickness of 19 microns. The black paint was applied over the white coat in a similar manner. The applied coat of the black paint dried to a thickness of 22 microns.

Subsequently, the composite layer was magnetized with the black coat side being the N pole and the white coat side being the S pole. The two coats bound tightly to each other were peeled of the polypropylene film, mixed with water, pulverized by a homogenizer and classified, to provide flake-shaped fine magnetic grains measuring 44 to 149 microns in particle size and having opposite magnetic poles tinged in the two colors, black and white. The fine magnetic grains had a residual magnetic moment of 1.87 emu/g and a coercive force of 2780 oersteds.

Next, 2 parts of A-C Polyethylene #9 was dissolved by heating in 98 parts of Isopar-M and the resultant solution was cooled. A liquid dispersion was obtained by dispersing 4 parts of the fine magnetic grains in 14 parts of the liquid dispersion. The liquid dispersion thus produced had a yield value of 22.7 dynes/cm$^2$.

Subsequently, a magnetic display panel was produced by filling the liquid dispersion in individual hexagonal cells of a multi-cell plate having a cell size of 3 mm and a cell wall height of 1 mm and joined with an adhesive agent to a plastic film 0.1 mm in thickness. The open side of the multi-cell plate was then covered with a plastic film 0.1 mm in thickness with the use of an adhesive agent and thereafter causing the fine magnetic grains in the liquid dispersion to be densely arranged close to the plastic film on the display side using Plastiform (a multipolarly magnetized magnet made by Sumitomo-3M Co.). The adhesive agent used in this case was prepared by mixing 10 parts of Adeka-Resin EP4000 (an epoxy resin made by Asahi Denka Kogyo K.K.) with 3 parts of Epomate B002 (a curing agent made by Ajinomoto Co.).

EXAMPLE 32

A magnetic display panel was produced following the procedure of Example 31 except that the liquid dispersion used therein was obtained by first thermally dissolving 1.5 parts of Hoechst Wax OP (a partially saponified esteric wax made by Hoechst Japan Co.) in 98.5 parts of Isopar-M, cooling the resultant liquid dispersion and dispersing the fine magnetic grains in the aforementioned liquid dispersion. Also, the adhesive agent used therein was obtained by mixing 10 parts of Adeka-Resin EP4000 with 1 part of Anchor-1170 (a curing agent made by Anchor Chemical Co. of the U.K.). The fine magnetic grains had a residual magnetic moment of 1.37 emu/g and a coercive force of 2780 oersteds and the liquid dispersion and a yield value of 18.9 dynes/cm$^2$.

EXAMPLE 33

A magnetic display panel was produced following the procedure of Example 31 except that the black paint was prepared by dispersing 15 parts of BF-T and 2.5 parts of MA-11 in 330 parts of a solution of 40% Epo-Tohto YD-017 in methylethyl ketone, the fine magnetic grains had a black paint layer thickness of 15 microns and the white paint layer a thickness of 20 microns. Also, the liquid dispersion used therein was prepared by thermally dissolving 0.7 part of N-acyl-glumatic acid diamido (an N-acylamino acid derivative made by Ajinomoto Co.) in 99.3 parts of Isopar-M, cooling the resultant liquid dispersion and then dispersiing the fine magnetic grains in the aforementioned liquid dispersion. Further, the adhesive agent used therein was prepared by mixing 10 parts of Adeka-Resin EP4000 with 1 part of Anchor 1170. The fine magnetic grains had a residual magnetic moment of 0.81 emu/g and a coercive force of 2750 oersteds and the liquid dispersion had a yield value of 10.1 dynes/cm$^2$.

EXAMPLE 34

A magnetic display panel was produced following the procedure of Example 31 except that the liquid dispersion used therein was obtained by first thermally dissolving 2 parts of aluminum tristearate in 98 parts of Isopar-M, cooling the resultant liquid dispersion and then dispersing the fine magnetic grains in the aforementioned solution. Also, the adhesive agent used therein was prepared by mixing 10 parts of Adeka-Resin EP4000 with 1 part of Anchor-1170. The fine magnetic grains had a residual magnetic moment of 1.87 emu/g and a coercive force of 2780 oersteds and the liquid dispersion had a yield value of 18.5 dynes/cm$^2$.

EXAMPLE 35

A magnetic display panel was produced following the procedure of Example 31 except that the black paint was prepared by dispersing 15 parts of BF-T and 2.5 parts of MA-11 in 330 parts of a solution of 40% Epo-Tohto YD-017 in methylethyl ketone. Also, the fine magnetic grains had a black paint layer thickness of 15 microns and a white paint layer thickness of 20 microns. Further, the liquid dispersion used therein was obtained by thermally dissolving 2 parts of A-C Polyethylene #9 in 98 parts of Isopar-M and cooling the resultant liquid dispersion to give a Liquid dispersion (A), dissolving 2 parts of Aerosil 200 in 98 parts of Isopar-M to give a Liquid dispersion (B), Mixing 2 parts of Liquid dispersion (A) with 1 part of Liquid dispersion (B) and dispersing the fine magnetic grains in the resultant mixture. The adhesive agent used therein was prepared by mixing 15 parts of Adeka-Resin EP4000 with 1 part of TTA (triethylene tetramine made by Kanto Chemical Co.). The fine magnetic grains had a residual magnetic moment of 0.81 emu/g and a coercive force of 2750 oersteds and the liquid dispersion had a yield value of 14.3 dynes/cm$^2$.

EXAMPLE 36

A magnetic display panel was produced following the procedure of Example 31 except that the black paint was prepared by dispersing 15 parts of BF-T and 2.5 parts of MA-11 in 330 parts of a solution of 40% Epo-Tohto YD-017 in methylethyl ketone. Also, the fine magnetic grains had a black paint layer thickness of 15 microns and a white paint layer thickness of 20 microns. Further, the liquid dispersion was obtained by first adding 4.5 parts of DPDJ 9169 (an ethylene-ethyl acrylate copolymer made by Japan Unicar Co.) to 95.5 parts of Isopar-M and then heating, dissolving and then cooling to give a Liquid dispersion (A), dispersing 2.3 parts of Aerosil 200 in 97.7 parts of Isopar-M to give a Liquid dispersion (B), mixing 1 part of Liquid dispersion (A) with 1 part of Liquid dispersion (B) and dispersing the fine magnetic grains in the resultant mixture. The adhesive agent used therein was prepared by mixing 10 parts of Adeka Resin EP4000 with 1 part of Anchor-1170. The fine magnetic grains had a residual magnetic moment of 0.81 emu/g and a coercive force of 2750 oersteds and the liquid dispersion had a yield value of 7.0 dynes/cm$^2$.

EXAMPLE 37

A magnetic display panel was produced following the procedure of Example 31 except that the black paint was prepared by dispersing 15 parts of BF-T and 2.5 parts of MA-11 in 330 parts of a solution of 40% Epo-Tohto YD-017 in methylethyl ketone. Also, the fine magnetic grains had a black paint layer thickness of 15 microns and a white paint layer thickness of 20 microns. The liquid dispersion was obtained by thermally dissolving 2 parts of aluminum tristearate in 98 parts of Isopar-M and cooling the resultant liquid dispersion to give a Liquid dispersion (A) dispersing 2 parts of Aerosil 200 in 98 parts of Isopar-M to give a Liquid dispersion (B), mixing 1 part of Liquid dispersion (A) with 1 part of Liquid dispersion (B) and dispersing the fine magnetic grains in the resultant mixture. The adhesive agent used therein was obtained by mixing 10 parts of Adeka Resin EP4000 with 1 part of Anchor-1170. The fine magnetic grains had a residual magnetic moment of 0.81 emu/g and a coercive force of 2750 oersteds and the liquid dispersion had a yield value of 7.0 dynes/cm$^2$.

EXAMPLE 38

A magnetic display panel was produced following the procedure of Example 31 except that the black paint was prepared by dispersing 14.7 parts of BF-T and 0.6 part of MA-11 in 85 parts of a solution of 40% Epo-Tohto YD-017 in methylethyl ketone. Also, the fine magnetic grains had a black paint layer thickness of 27 microns and a white paint layer thickness of 24 microns. Further, the liquid dispersion used therein was obtained by thermally dissolving 2.5 parts of Hoechst Wax OP in 97.5 parts of Isopar-M and cooling the resultant liquid dispersion to give a Liquid dispersion (A), dispersing 2.3 parts of Aerosil 200 in 97.7 parts of Isopar-M to give a Liquid dispersion (B), mixing 1 part of Liquid dispersion (A) with 2 parts of Liquid dispersion (B) and dispersing the fine magnetic grains in the resultant mixture. The adhesive agent used therein was prepared by mixing 10 parts of Adeka Resin EP4000 with 1 part of Anchor-1170. The fine magnetic grains had a residual magnetic moment of 3.00 emu/g and a coercive force of 2760 oersteds and the liquid dispersion had a yield value of 30.5 dynes/cm$^2$.

EXAMPLE 39

A magnetic display panel was produced following the procedure of Example 31 except that the black paint was prepared by dispersing 15 parts of BF-T and 2.5 parts of MA-11 in 330 parts of a solution of 40% Epo-Tohto YD-017 in methylethyl ketone. Also, the fine magnetic grains had a black paint layer thickness of 15 microns and a white paint layer thickness of 20 microns. Moreover, the liquid dispersion was obtained by adding 6 parts of Leopar KE (a dextrin fatty acid ester made by Kaihatsu Kagaku K.K.) to 94 parts of Isopar-M to give a Liquid dispersion (A), dispersing 2 parts of Aerosil 200 in 98 parts of Isopar-M to give a Liquid dispersion (B), mixing 1 part of Liquid dispersion (A) with 1 part of Liquid dispersion (B) and dispersing the fine magnetic grains in the resultant mixture. The adhesive agent was prepared by mixing 10 parts of Adeka Resin EP4000 with 1 part of Anchor-1170. The fine magnetic grains had a residual magnetic moment of 0.81 emu/g and a coercive force of 2750 oersteds and the liquid dispersion had a yield value of 8.1 dynes/cm$^2$.

EXAMPLE 40

A magnetic display panel was produced following the procedure of Example 31 except that the black paint was prepared by dispersing 15 parts of BF-T and 2.5 parts of MA-11 in 330 parts of a solution of 40% Epo-Tohto YD-017 in methylethyl ketone. Also, the fine magnetic grains had a black paint layer thickness of 15 microns and a white paint layer thickness of 20 microns. Furthermore, the liquid dispersion was obtained by adding 3.5 parts of DPDJ9169 to 96.5 parts of Isopar-M, heating, dissolving, cooling and then dispersing the fine magnetic grains in the resultant liquid dispersion. The adhesive agent was prepared by mixing 10 parts of Adeka Resin EP4000 with 1 part of Anchor-1170. The fine magnetic grains had a residual magnetic moment of 0.81 emu/g and a coercive force of 2750 oersteds and the liquid dispersion had a yield value of 13.6 dynes/cm$^2$.

Reference examples will next be discussed.

The magnetic panels of Reference Examples 1-4 were each fabricated by joining a multi-cell plate 1 mm in wall height on which are formed a multiplicity of hexagonal cells 3 mm in cell size with an adhesive agent to a plastic film 0.1 mm in thickness and then covering the open side of the multi-cell plate with a plastic film 0.1 mm in thickness with the aid of an adhesive agent. The adhesive agent used in this case was prepared by mixing 10 parts of Adeka Resin EP4000 with 3 parts of Epomate B002. The magnetic panel of Reference Example 5 was formed by disposing two glass sheets 0.2 mm in thickness opposite one another and sealing three of the four common edge boundaries of the two glass sheets with interposed plastic spacers 1 mm in thickness and an adhesive agent to produce a case after which the remaining boundary of the case was sealed with the same plastic spacer and the same adhesive agent.

REFERENCE EXAMPLE 1

A white paint was prepared by dispersing 70 parts of Tipaque CR-50 in 75 parts of a solution of 40% Epo-Tohto YD-017 in methylethyl ketone. A black paint was prepared by dispersing 9.8 parts of BF-T and 0.4 part of MA-11 in 90 parts of a solution of 40% Epo-Tohto YD-017 in methylethyl ketone.

Then, the white paint was applied with a wire bar to one surface of a polypropylene film 30 microns in thickness. The applied coat of white paint dried to a thickness of 20 microns. The black paint was applied over the white coat in a similar manner. The applied coat of black paint dried to a thickness of 20 microns.

Subsequently, the composite layer was magnetized with the black coat side as the N pole and the white coat side as the S pole. The two coats bound tightly to each other were peeled off the polypropylene film, mixed with water and pulverized by a homogenizer and classified, to provide flake-shaped fine magnetic grains measuring 44 to 149 microns in particle size and having the opposite magnetic poles thereof tinged with the two colors, black and white. The fine magnetic grains had a residual magnetic moment of 1.87 emu/g and a coercive force of 2780 oersteds.

Then, a liquid dispersion was obtained by thermally-dissolving 0.5 part of aluminum tristearate in 99.5 parts of Isopar-M, cooling the resultant liquid dispersion and dispersing 4 parts of the fine magnetic grains in 14 parts of the resultant liquid dispersion. A magnetic display panel was produced using this liquid dispersion. The liquid dispersion had a yield value of 2 dynes/cm$^2$.

REFERENCE EXAMPLE 2

A magnetic display panel was produced following the procedure of Reference Example 1 except that the black paint was prepared by dispersing 3 parts of BF-T and 2 parts of MA-11 in 330 parts of a solution of 40% Epo-Tohto YD-017 in methylethyl ketone. Also, the fine magnetic grains had a black paint layer thickness of 15 microns and the liquid dispersion used therein was obtained by thermally dissolving 2 parts of A-C Polyethylene #9 in 98 parts of Isopar-M, cooling the resultant liquid dispersion and dispersing the fine magnetic grains in the aforementioned liquid dispersion. The fine magnetic grains had a residual magnetic moment of 0.15 emu/g and a coercive force of 2780 oersteds, and the liquid dispersion had a yield value of 22.7 dynes/cm$^2$.

REFERENCE EXAMPLE 3

A magnetic display panel was produced following the procedure of Reference Example 1 except that the black paint was prepared by dispersing 12.6 parts of BF-T and 0.4 part of MA-11 in 20 parts of a solution of 40% Epo-Tohto YD-017 in methylethyl ketone. Also, the fine magnetic grains had a black paint layer thickness of 30 microns and a white paint layer thickness of 15 microns. The liquid dispersion was obtained by thermally dissolving 2 parts of A-C Polyethylene #9 in 98 parts of Isopar-M, cooling the resultant liquid dispersion and dispersing the fine magnetic grains in the aforementioned liquid dispersion. The fine magnetic grains had a residual magnetic moment of 11.00 emu/g and a coercive force of 2780 oersteds and the liquid dispersion had a yield value of 22.7 dynes/cm$^2$.

REFERENCE EXAMPLE 4

A magnetic display panel was produced following the procedure of Reference Example 1 except that the black paint was prepared by dispersing 9.8 parts of powdered magnetite and 0.4 part of MA-11 in 90 parts of a solution of 40% Epo-Tohto YD-017 in methylethyl ketone. Further, the liquid dispersion was obtained by thermally dissolving 2 parts of A-C Polyethylene #9 in 98 parts of Isopar-M, cooling the resultant liquid dispersion and then dispersing 4 parts of the fine magnetic grains in 14 parts of the aforementioned liquid dispersion. The fine magnetic grains had a residual magnetic moment of 0.89 emu/g and a coercive force of 150 oersteds and the liquid dispersion had a yield value of 22.7 dynes/cm$^2$.

REFERENCE EXAMPLE 5

A magnetic display panel was produced following the procedure of Reference Example 1 except that the liquid dispersion used therein was obtained by dispersing the fine magnetic grains in 100 parts of Daifroyl #3 (a low polymer of trifluoroethylene chloride made by Daikin Industry Co.). The fine magnetic grains had a residual magnetic moment of 1.87 emu/g and a coercive force of 2780 oersteds and the liquid dispersion had a yield value of 0 dyne/cm$^2$. Daifroyl #3 had the same specific gravity of 1.92 as the fine magnetic grains.

Test results obtained for the reference examples and the examples of the present invention are indicated below.

| | Difference of density between black display zone and white display zone | Loss of clarity of displayed record |
|---|---|---|
| Example 1 | 0.95 | None |
| Example 2 | 1.05 | None |
| Example 3 | 0.92 | None |
| Example 4 | 0.69 | Slight loss of clarity |
| Example 5 | 0.98 | None |
| Example 6 | 0.91 | None |
| Example 7 | 1.18 | None |
| Example 8 | 1.11 | None |
| Example 9 | 0.89 | None |
| Example 10 | 0.63 | Slight loss of clarity |
| Example 11 | 1.01 | Slight loss of clarity |
| Example 12 | 0.89 | None |
| Example 13 | 1.15 | None |
| Example 14 | 1.13 | None |
| Example 15 | 1.14 | None |
| Example 16 | 1.09 | None |
| Example 17 | 1.00 | None |
| Example 18 | 0.85 | Slight loss of clarity |
| Example 19 | 0.85 | None |
| Example 20 | 1.12 | None |
| Example 21 | 1.18 | None |
| Example 22 | 1.04 | None |
| Example 23 | 0.95 | None |
| Example 24 | 0.80 | None |
| Example 25 | 0.75 | Slight loss of clarity |
| Example 26 | 1.05 | None |
| Example 27 | 1.18 | None |
| Example 28 | 1.03 | None |
| Example 29 | 1.05 | None |
| Example 30 | 1.05 | None |
| Example 31 | 1.15 | None |
| Example 32 | 0.95 | None |
| Example 33 | 0.97 | Slight loss of clarity |
| Example 34 | 1.13 | None |
| Example 35 | 1.19 | None |
| Example 36 | 1.17 | None |
| Example 37 | 1.18 | None |
| Example 38 | 1.19 | None |
| Example 39 | 0.69 | Slight loss of clarity |
| Example 40 | 0.75 | Slight loss of clarity |
| Reference Example 1 | Not measurable | No display obtainable |
| Reference Example 2 | 0.2 | No display obtainable |
| Reference Example 3 | 0.23 | Heavy loss of clarity |
| Reference Example 4 | Not measurable | No display obtainable |
| Reference Example 5 | Not measurable | No display obtainable |

The tests were conducted by attaching the magnetic display panel to a wall perpendicularly to the floor, sliding two magnetic erasers of mutually different polarities (both measuring 40×80×18 mm and having a flux density of 360 gauss) over two different portions of the surface plate on the display side of the panel thereby producing a white background and a black background respectively in the halved portions of the panel surface, measuring the densities of the two backgrounds with a Macbeth densitometer Model RD-514 (made by Macbeth Corp. of the United States), and subtracting the value of the density of the white background from that of the black background. The difference found was recorded as the difference of density. Test patterns were then displayed one each on the white and black backgrounds using two magnetic writing pens of mutually different polarities (both measuring 2.2 mm in diameter and 5 mm in length and having a flux density of 540 gauss). The displayed test patterns were visually examined for loss of clarity of display.

The results were as follows. In the panel of Reference Example 1, since the fine magnetic grains had sedimented within the cells, white and black backgrounds could not be formed, the respective densities could not be determined and, consequently, the test patterns could not be displayed. In the panel of Reference Example 2, since substantially none of the fine magnetic grains had been reversed within the cells, both black dots and white dots appeared randomly in both of the two portions of the display surface, and consequently the difference in density was too slight to permit clear display. In the panel of Reference Example 3, since the fine magnetic grains underwent heavy cohesion, what of the test pattern which was displayed at all suffered from a heavy loss of clarity. In the panel of Reference Example 4, since substantially none of the fine magnetic grains had been reversed within the cells, both black dots and white dots appeared randomly in both the two portions of the display surface and, consequently, the densities could not be measured and no display could be obtained. In the panel of Reference Example 5, since part of the fine magnetic grains had sedimented and most of them underwent cohesion, neither a white nor black background could be formed and, consequently, the densities could not be measured and no display could be obtained. In contrast, the panels of Examples 1–40 showed absolutely no deficiency in practical utility.

It is clear from the foregoing test results that the magnetic display panels of the examples of the invention which used fine magnetic grains having residual magnetic moments within the range of from 0.2 to 10 emu/g and liquid dispersions having yield values of not less than 5 dynes/cm$^2$ invariably gave good results for all test conditions and thus have proved to be highly useful.

What is claimed is:

1. A magnetic reversal type display panel comprising: two opposed surface plates and a liquid dispersion sealed in the space between said surface plates, said liquid dispersion comprising fine reversible magnetic display grains having magnetic poles of opposite signs tinged with different colors, a dispersion medium and a fine grain thickener, wherein:
   (A) said fine reversible magnetic display grains have a residual magnetic moment within the range of from 0.2 to 10 emu/g and a coercive force of not less than 500 oersteds, and
   (B) said liquid dispersion has a yield value of not less than 5.0 dynes/cm$^2$.

2. The magnetic display panel according to claim 1 wherein said fine reversible magnetic display grains have a particle size within the range of from 20 to 500 microns.

3. The magnetic display panel according to claim 1 wherein fine reversible magnetic display grains contain 1 to 40% by weight of at least one magnetic substrate selected from the group consisting of ferrites, rare earth cobalt compounds, cobalt-containing gamma iron oxide, and cobalt-containing magnetites.

4. The magnetic display panel according to claim 1 wherein the proportion of said fine reversible magnetic display grains to 100% by weight of the dispersion medium is not less than 4% by weight.

5. The magnetic display panel according to claim 1 wherein the proportion of the fine grain thickener to 100% by weight of the dispersion medium is not less than 0.5% by weight.

6. The magnetic display panel according to claim 1 wherein said dispersion medium comprises an aliphatic hydrocarbon solvent.

7. The magnetic display panel according to claim 1 wherein said fine grain thickener comprises finely powdered silicic acid.

8. The magnetic display panel according to claim 1 wherein said fine grain thickener comprises an olefin polymer.

9. The magnetic display panel according to claim 1 wherein said fine grain thickener comprises a copolymer of an olefin and a monomer copolymerizable with said olefin.

10. The magnetic display panel according to claim 1 wherein said fine grain thickener comprises a wax.

11. The magnetic display panel according to claim 1 wherein said fine grain thickener comprises a metal soap.

12. The magnetic display panel according to claim 1 wherein said fine grain thickener comprises an acylamino acid ester.

13. The magnetic display panel according to claim 1 wherein said fine grain thickener comprises finely powdered silicic acid and at least one member selected from the group consisting of olefin polymers, olefin copolymers, waxes, metal soaps and dextrin fatty acid esters.

14. The magnetic display panel according to claim 1 wherein at least one of said opposed surface plates is transparent and translucent.

15. The magnetic display panel according to any of claims 1-14 further comprising a multi-cell structure between said surface plates and wherein said liquid dispersion is sealed in said multi-cell structure.

16. The magnetic display panel according to any of claims 1-14 wherein one of said surface plates has formed therein a plurality of independent through cells and wherein said liquid dispersion is sealed in said through cells.

17. The magnetic display panel according to any of claims 1-14 further comprising a multi-cell plate disposed between said surface plates and wherein said liquid dispersion is sealed in cells of said multi-cell plates.

18. The magnetic panel according to claim 1 wherein the yield value of said dispersion medium is at least 5.0 dynes/cm$^2$ for a residual magnetic moment of said magnetic display grains in the range of 0.2 emu/g to 3.0 emu/g, and a gradually increasing yield value of from 5.0 dynes/cm$^2$ to 30 dynes/cm$^2$ for a residual magnetic moment of said magnetic display grains in the range of 3 emu/g to 10 emu/g.

* * * * *